United States Patent [19]

Gallant

[11] 4,234,112
[45] Nov. 18, 1980

[54] WATER SKI RACK

[76] Inventor: Guy G. Gallant, 770 W. 100th Pl., Denver, Colo. 80221

[21] Appl. No.: 894,938

[22] Filed: Apr. 10, 1978

[51] Int. Cl.³ .............................................. B60R 9/12
[52] U.S. Cl. ........................... 224/42.43; 211/60 SK; 224/42.46 R; 248/206 R; 280/814
[58] Field of Search ................. 224/42.45 R, 42.46 R, 224/29 R, 42.43, 42.44, 42.03 R, 42.03 B, 42.07, 42.08, 273; 9/1.6, 1.7, 310 R, 310 A; 248/206 R; 211/60 SK; 280/11.37 K, 11.37 A

[56] References Cited

U.S. PATENT DOCUMENTS

| | | | |
|---|---|---|---|
| 2,169,183 | 8/1939 | Fish | 248/206 R |
| 2,499,103 | 2/1950 | Love | 224/42.43 |
| 2,554,650 | 5/1951 | Waite | 224/42.1 F |
| 2,698,119 | 12/1954 | Cicogna | 224/42.43 |
| 3,018,897 | 1/1962 | Carlyle | 211/60 SK |
| 3,155,238 | 11/1964 | Bennett | 211/60 SK |
| 3,209,970 | 10/1965 | Canell | 224/42.1 F |
| 3,291,427 | 12/1966 | Hutchings | 224/42.45 R X |
| 3,527,354 | 9/1970 | Sokolow | 211/60 SK |
| 3,701,436 | 10/1972 | Adams | 224/42.45 R X |
| 3,756,420 | 9/1973 | Brown | 211/60 SK |
| 3,776,437 | 12/1973 | Carney | 224/42.1 F X |
| 3,881,143 | 5/1974 | Page | 211/60 SK X |
| 3,918,666 | 11/1975 | Florian | 248/206 R |
| 3,925,836 | 12/1975 | Simmonds | 9/310 A |
| 4,077,554 | 3/1978 | Goode | 224/42.46 R |

Primary Examiner—Robert J. Spar
Assistant Examiner—Jerold M. Forsberg
Attorney, Agent, or Firm—John E. Reilly

[57] ABSTRACT

A ski rack for water skis is designed to releasably retain either one or two sets of water skis on the external surface of a boat, such as, the gunwale of an open boat or the top or side of a closed bow boat. A mounting frame has telescopically and rotatably adjustable leg supports extending in one direction for releasable attachment to the boat and one or more mounting posts extending in the opposite direction which cooperate with adjustable stops to releasably retain the skis in position on the mounting frame.

14 Claims, 5 Drawing Figures

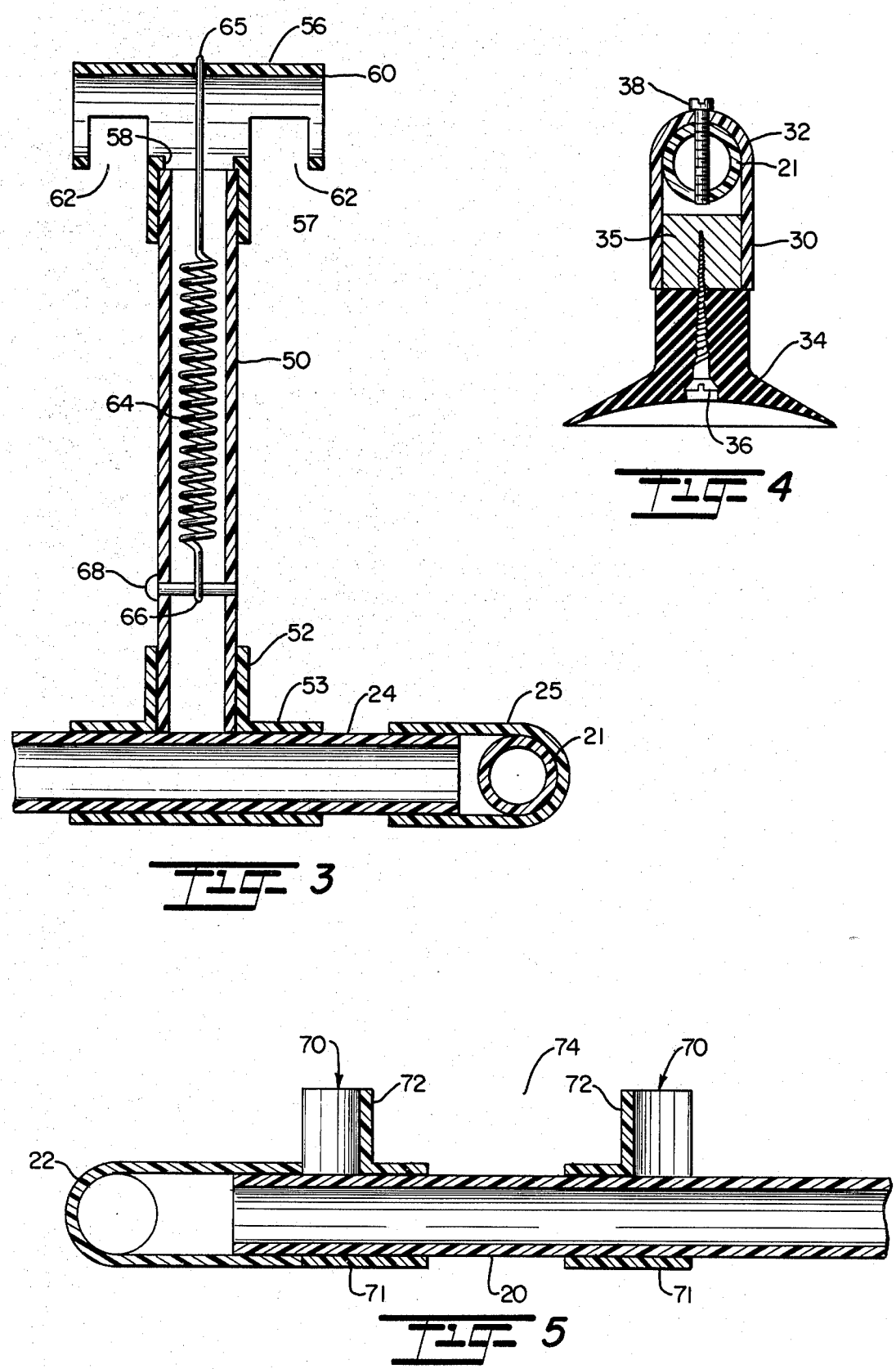

;# WATER SKI RACK

BACKGROUND OF THE INVENTION

This invention relates to ski racks, and more particularly relates to ski racks adaptable for releasable attachment to the external surface of a boat whereby to facilitate storage of water skis in a safe, out-of-the-way position.

Various carriers or racks have been devised in the past which are designed to permit releasable mounting of skis on a motor vehicle, such as, an automobile trunk lid or the inner portion of a boat. Representative of such devices are those disclosed and illustrated in U.S. Pat. to Page No. 3,811,843, Carlyle U.S. Pat. No. 3,018,897, and to Sicogna U.S. Pat. No. 2,698,119. These and other patents generally suggest utilization of various types of leg supports having suction cups to facilitate releasable connection to the external surface of a motor vehicle. Additionally, provision has been made for spring-loaded mounting posts to facilitate edgewise, releasable connection or mounting of skis on the rack or mounting frame, such as, exemplified by the patent to Carlyle referred to above.

The safe, convenient storage of water skis in a boat presents particular problems as a result of their size and width and the attendant difficulties of handling the water skis as they are removed from a water skiier. The approach in the past has been either to loosely place the water skis in the bottom of the boat or to stow them on a mounting rack which can be positioned within the confines of the boat. In either case, storage of the skis has presented definite problems from the standpoint of safety since they occupy a substantial amount of space especially in boats of limited size and therefore can present a real hazard to occupants of the boat. Accordingly, there is a need for a water ski rack which can be mounted on the external surface of a boat, such as for instance, the gunwale of an open boat or the side or top of a closed bow boat; yet in such a way as to be readily accessible and to facilitate ease of ski mounting and release while avoiding any possibility of shifting or accidental displacement of the skis when the boat is in motion. At the same time it is highly desirable that the water ski rack permit compact mounting of one or more sets of water skis in an out-of-the-way position on an external surface of the boat; and that the ski rack be positively but releasably attachable to the external surface of a boat and be readily conformable for attachment to different contours or shapes.

SUMMARY OF THE INVENTION

It is therefore an object of the present invention to provide for a ski rack which is conformable for placement at different locations on the external surface of a boat and in such a way as to permit storage of one or more sets of water skis in an out-of-the-way position.

It is another object of the present invention to provide for a water ski rack which is releasably attachable to an external surface of the boat and which is compact, lightweight and of high strength; and further is so constructed and arranged as to be buoyant in the event that it is accidentally removed or detached from the boat when it is in the water.

It is a further object of the present invention to provide for a water ski rack readily conformable for mounting at different locations on the gunwale of an open boat or top or side of a closed bow boat, and which provides ski mounting assemblies adjustable for different width and length skis in a reliable and efficient manner; further wherein the ski rack can be stowed when not in use in a relatively small area and readily unfolded for mounting in a desired out-of-the-way position on the boat; and further wherein a novel form of leg support assembly is provided to facilitate ease of releasable attachment at the desired angle on the boat together with one or more ski mounting assemblies which will facilitate edgewise mounting of one or more pairs of water skis in edgewise relation to the external surface of the rack.

In a preferred embodiment of the present invention, a water ski rack has been devised which includes lightweight tubular members arranged in an open rectangular or square framework with spaced leg support members extending in one direction from the framework having suction cups or other surface attachment means at the free ends of the legs. At least one pair of the leg support members are both adjustable in length and angularly adjustable to facilitate disposition of the rack at the desired angle on the external surface so as to be most convenient for releasable mounting and placement of the skis particularly on the external side surface or gunwale of an open boat. The attitude or relative disposition of the leg support members is such as to be readily conformable for attachment to different contoured or angled surfaces where the angle between attachment surfaces may be as much or greater than 90°. Moreover, mounting post assemblies are provided for each set of skis to be secured to the rack, each mounting post assembly including an intermediate spring-loaded mounting post having an enlarged slotted head at its free end away from the frame which can be moved outwardly against the force or urging of the spring for edgewise placement of a pair of skis in back-to-back parallel relation between the head and frame; and when the head is released, it will be biased against the upper or outer edge of the intermediate part of the ski to retain it in edgewise relation to the frame. Cooperating with each mounting post are a pair of adjustable stops located on opposite and portions of the frame and which are slidably adjustable against oppositely facing surfaces of the skis so as to stabilize the ski against any shifting or accidental displacement from the intermediate mounting post.

BRIEF DESCRIPTION OF THE DRAWINGS

The above and other objects, advantages and features of the present invention will become more readily appreciated and understood from a consideration of the following detailed description of a preferred embodiment when taken together with the accompanying drawings, in which:

FIG. 3 is a cross-sectional view taken about lines 3—3 of FIG. 1 and illustrating the relationship between parts in enlarged form.

FIG. 4 is a cross-sectional view taken about lines 4—4 of FIG. 1; and

FIG. 5 is a cross-sectional view taken about lines 5—5 of FIG. 1.

DETAILED DESCRIPTION OF THE PREFERRED EMBODIMENT

Figure 1:
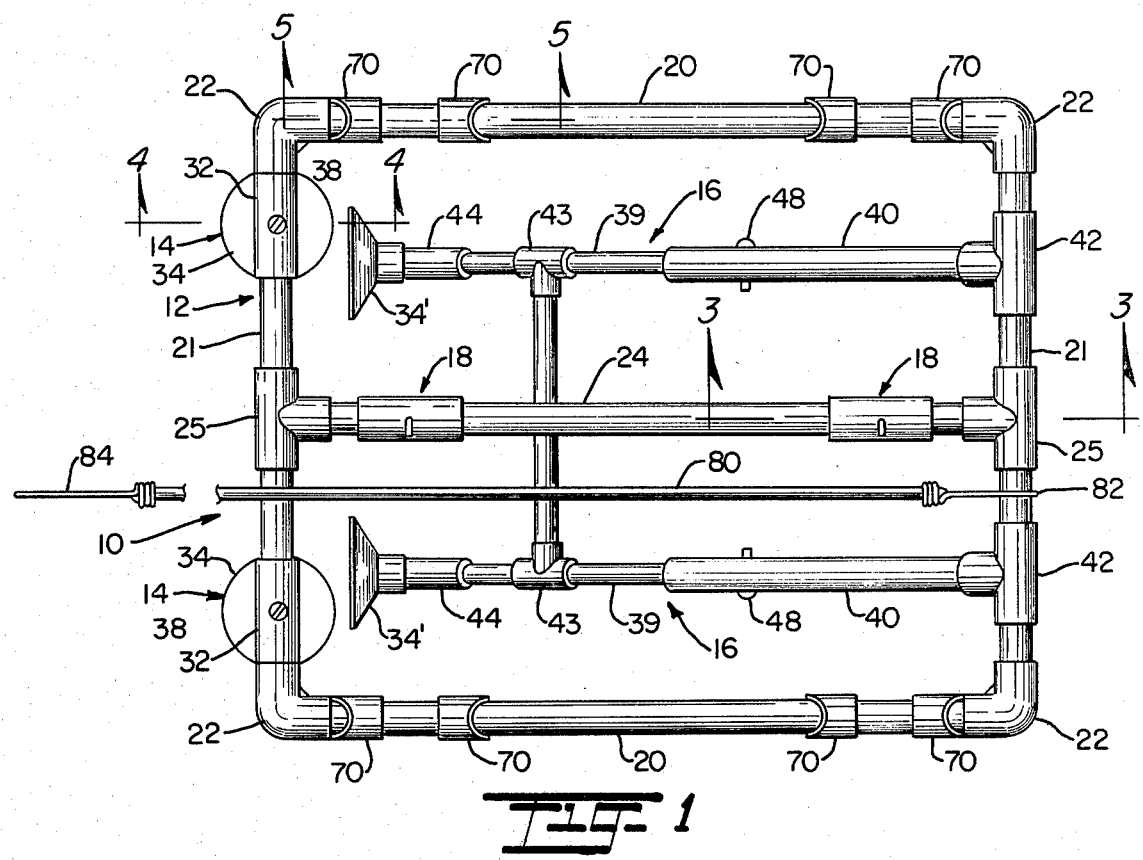
FIG. 1 is a plan view of a preferred form of water ski rack in accordance with the present invention.
Figure 2:
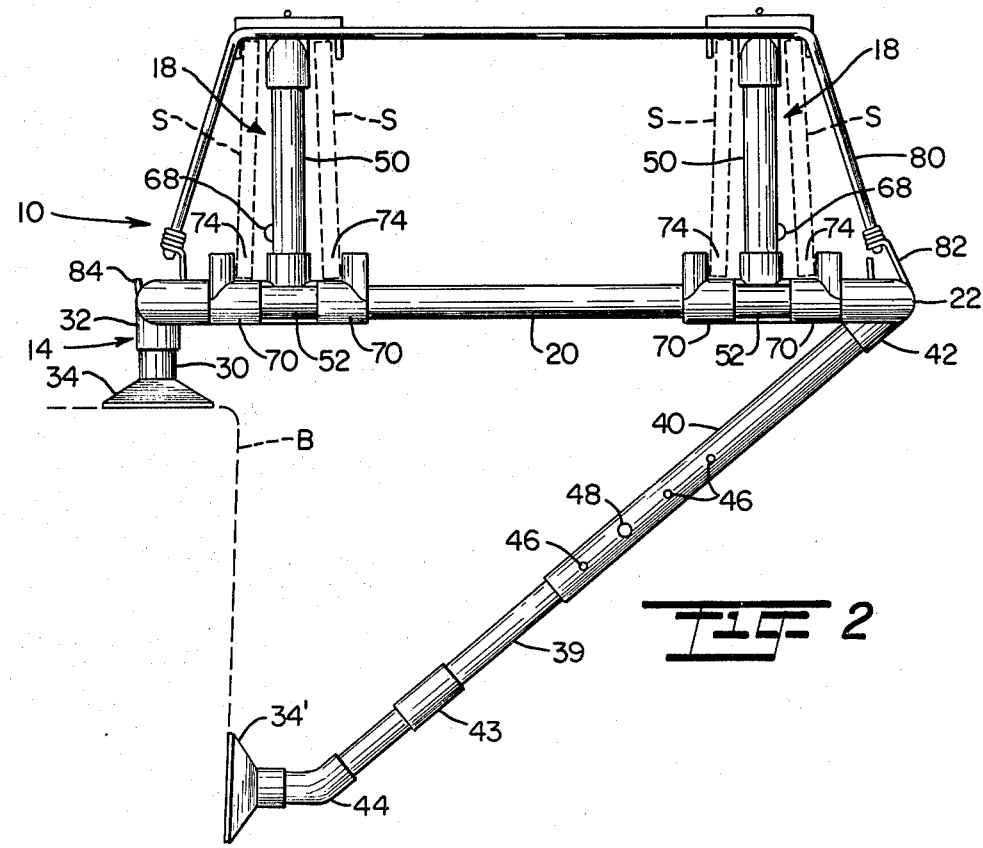
FIG. 2 is a front elevational view illustrating one typical mode of attachment of the rack of the present invention to the gunwale of a boat.

Referring in more detail to the drawings, there is shown by way of illustrative example a water ski rack generally designated at 10 which is broadly comprised of a main frame 12, securing means in the form of a pair of inboard leg support members 14 and outboard leg support members 16, and ski mounting post assemblies 18. As shown in FIG. 2, the mounting post assemblies 18 are designed to facilitate mounting of skis designated at S in back-to-back, edgewise relation across the upper surface of the frame when the rack is mounted on the gunwale of a boat as represented at B.

In the preferred embodiment as shown, the main frame 12 is of generally rectangular configuration having opposite side members 20 and opposite end members 21 which are joined together to the side members by elbows 22 at each of the four corners of the frame. A cross member 24 extends intermediately across the frame between the opposite ends 21 and is joined to the ends by Tees 25. Preferably, the side members 20, end members 21 and cross member 24 all are of tubular configuration and contain a flotation material therein to lend additional buoyancy to the structure; and the tubular members may be suitably composed of a polyvinylchloride extrusion or other similar plastic or plastic-like material which will facilitate bonding together of the tubular side and end members to their corners 22 as well as permanent attachment of the cross member to the Tees 25 which are preferably bonded in place in surrounding relation to the tubular end members 21. It will be evident also that metal tubing may be employed to make up part or all of the tubular frame as described although in its preferred application for use as a water ski rack the lightweight plastic material has been thought to be more suitable.

In order to facilitate releasable attachment of the rack to various external surfaces, such as, the gunwale of the boat as shown, the inboard support members 14 are comprised of relatively short lengths of tubing 30 secured on opposite sides of the cross member 24 to one of the end members 21 by Tees 32, the cross portion of each Tee 32 being firmly affixed to the end member 21. The end of each leg 30 opposite to the Tee connection 32 is provided with a suitable fastener preferably in the form of a suction cup 34, which as best seen from FIG. 4, is affixed to the lower end of the tubular portion 30 by positioning a block or wooden plug 35 within the hollow end of the tube and inserting a screw 36 upwardly through the center of the suction cup into the plug 35. As further seen from FIG. 4, a lag screw 38 may be inserted through aligned bores in the Tee 32 and the end member 21 so as to fix each of the inboard leg support members 14 in position; or in the alternative, if it is desired to permit pivotal adjustment of the leg members 14 a thumb screw may be employed in place of the screw 38 to bear against the end member and releasably lock each leg member in position.

In turn, the outboard leg support members 16 are each comprised of inner and outer concentric, telescoping tubular members 39 and 40, respectively, each outer concentric tubular member 40 being inserted into the end of a Tee 42 which is disposed on the outer end member 21, and the inner concentric tubular member 39 has its lower end inserted in a 45° elbow 44 and also is provided with a reinforcing sleeve 43. The elbow 44 similarly includes fastening means in the form of a suction cup 34' corresponding to the suction cups 34 placed on the lower ends of the inboard leg support members 14. The leg support members 16 are made adjustable in length by a positioning hole, not shown, in the inner tubular member 39 which is alignable with one of the positioning holes 46 in the outer tubular section 40, and a suitable pin or shackle 48 is insertable through the aligned openings to fix the tubular members 39 and 40 at the desired length. The Tees 42 as illustrated in FIG. 2, are angularly or rotatably adjustable about the outer end member 21 while being snugly positioned thereon so as to permit adjustment of the outboard leg support members at the desired angle with respect to the surface to which the fasteners 34' are to be secured.

The preferred form of mounting post assembly 18 is defined by an upstanding tubular member 50 which is affixed to the cross member 24 by a Tee 52 having a cross portion 53 slidably adjustable on member 24. In turn, the opposite or upper end of each post is preferably constructed, as best seen from FIG. 3, to include a generally T-shaped, enlarged head 56 in which the central tubular portion of the head as indicated at 57 is disposed in outer concentric relation to the upper end of the tube 50 with an inner shoulder or ledge 58 at the upper extremity of the portion 57 to limit the inward extension of the tube 50 therein. Moreover, the head 56 has a hollow cross-portion 60 which is slotted as at 62 on opposite sides of the center portion 57 so as to define downwardly facing channels or slots for reception of the upper edges of the skis. The enlarged head 56 is spring-loaded in a direction urging the head downwardly with respect to the tube by a compression spring 64 having its upper end 65 affixed to the upper surface or top of the head 56 and its lower end 66 anchored to a cross-pin 68 which is affixed in the lower end of the center tube 50 as shown. In this manner, the skis may be positioned on opposite sides of each mounting post simply by inserting the upper edges of the skis into the slots 62 and forcing the head 56 upwardly against the urging of the spring until the lower edges of the skis rest against the upper surface of the cross portion Tee 52.

A pair of limit stops 70 are positioned on each of the side frame members 20 in alignment with each of the mounting posts 18. As shown in FIG. 5, each limit stop 70 may suitably take the form of an elbow having a tubular portion 71 inserted over the frame member 20 and an upstanding semi-cylindrical portion 72 which presents a curved or convex surface in facing relation to the associated limit stop 70 of each pair. Each of the elbows 70 is snugly but adjustably positioned on the side frame member 20 so that it may be advanced toward and away from the other stop lengthwise of the frame to form a cooperating channel 74 therebetween adjacent stops for reception of the lower edges of the skis. As a result, the aligned pairs of limit stops 70 opposite to each of the mounting posts cooperate with the mounting posts in releasably securing the skis against shifting or accidental displacement from the ski rack. Additionally, a suitable connecting strap or elastic cord 80 may have one end 82 connected to the outboard end frame 21 so that it can be stretched over the upper edges of the skis S once mounted within the mounting post assemblies and with an opposite end 84 being hooked to the inboard end frame member 21, as shown in FIG. 2. Each of the connecting ends 82 and 84 may be a generally hook-shaped wire connector with the connecting end 82 being closed upon itself as shown to be permanently attached to the outboard frame 21 while the other connecting end 84 is bent into an open configuration to permit it to be releasably connected to the inboard frame member 21.

By virtue of the relationship established between the inboard and outboard leg support members 14 and 16 it will be evident that the rack may be affixed to various different contoured surfaces while maintaining a horizontal or substantially horizontal attitude or disposition; or if desired may be cocked at any desired angle, for example, when affixing it to the top surface of a closed bow boat. If desired another safety cord may be attached to extend from the rack to some portion inside of the boat in the event that the rack is accidentally released from the boat surface. While a preferred form of invention has been disclosed, it will be apparent that various modifications and changes may be made in the specific construction and arrangement of parts as well as the particular configuration of the frame and leg support members without departing from the present invention. For instance, the frame 12 may be modified to accommodate a single mounting post assembly for holding one set of skis. If desired, for mounting on the top of closed bow boats, the leg support members may be relatively short or in other words consist entirely of the relatively short leg supports corresponding to the inboard leg members 14 and may be designed to accommodate either one or two sets of skis.

It is therefore to be understood that the above and other changes and modifications may be made without departing from the spirit and scope of the present invention as defined by the appended claims.

What is claimed is:

1. A ski rack adaptable for mounting on the horizontal top and vertical side external surfaces of a boat and the like comprising:
    a frame;
    rack securing means extending from said frame including a pair of relatively short, fixed leg support members and a pair of relatively long, telescopically and angularly adjustable leg support members thereon, each of said leg support members having releasable attachment means at its free end for releasably securing said fixed leg support members to said horizontal top surface and said angularly adjustable leg members to said vertical side surface of said boat; and
    a ski mount assembly including ski support means adapted to releasably retain the intermediate portions of a pair of skis in edgewise, substantially parallel relation to one another, said ski support means including an upstanding post on said frame, a spring-loaded, enlarged head at one end of said post opposite to said frame, said head having guide channels along the side of said mounting post in facing relation to said frame, each adapted to receive a side edge of a ski and said head being spring-loaded in a direction urging it toward said mounting frame, and a pair of adjustable stop members on said frame in spaced relation to said ski support means, said adjustable stop members being movable into engagement with oppositely facing surfaces of said skis whereby to cooperate with said ski support means in releasably retaining a pair of skis on said rack.

2. A ski rack according to claim 1, said releasable attachment means being defined by suction cups at the free ends of said leg support members.

3. A ski rack according to claim 1, said open frame being of generally rectangular configuration having opposite sides and end frame members, said pair of relatively short, fixed leg supports secured in spaced relation to one another to one of said side frame members, and said pair of relatively long, telescopically and angularly adjustable leg support members secured in spaced relation to the other of said side frame members, said relatively long leg support members being angularly adjustable in a direction toward and away from said relatively short leg support members.

4. A ski rack according to claim 3, said relatively long leg support members including telescoping inner and outer concentric tubular members, positioning means for adjusting the effective length of said inner and outer concentric tubular members, and an angular connector at the free end of each of said relatively long leg support members to which each of said releasable means is affixed.

5. A ski rack according to claim 1, there being aligned pairs of adjustable stop members mounted on said frame with said ski support means positioned intermediately between said pairs of adjustable stop members.

6. A ski rack according to claim 1, said frame being of open, generally rectangular configuration having opposite sides and end frame members, a cross member extending between opposite side members, and a pair of ski mount assemblies extending in a direction parallel to the side frame members of said frame.

7. A ski rack according to claim 6, each of said ski mount assemblies including a mounting post on said cross member and a pair of adjustable stop members slidably positioned on each of said side frame members and adapted to be aligned with one another and with said associated mounting post, said ski support means cooperating with said aligned pairs of adjustable stop members to retain a pair of skis in edgewise upstanding relation to said mounting frame with said adjustable stop members engaging oppositely facing flat surface portions of said skis.

8. A buoyant water ski rack adapted to be mounted on the external surface of a boat and the like, comprising:
    a main frame comprised of lightweight tubular members of generally rectangular configuration having opposite sides and end frame members, a pair of relatively short, stationary tubular support members secured in spaced relation to one another to one of said end frame members, and a second pair of relatively long, telescopically and angularly adjustable tubular support members secured in spaced relation to the other of said end frame members, said relatively long tubular support members being angularly adjustable in a direction toward and away from said relatively short tubular support members, each of said leg support members having releasable attachment means at its free end for releasably securing said fixed leg support members and said angularly adjustable leg members to the external surface of said boat and a ski mount assembly including spring-loaded ski support members adapted to releasably retain the intermediate portions of a pair of skis in edgewise, substantially parallel relation to one another on said frame, and a pair of adjustable stop members on said frame in longitudinally spaced relation to said ski support members, said adjustable stop members being movable into engagement with oppositely facing surfaces of said skis at a point longitudinally spaced from the engagement of said ski support members whereby to cooperate with said ski support members in releasably retaining a pair of skis on said frame.

9. A buoyant water ski rack according to claim 8, said relatively long tubular support members including telescoping inner and outer concentric tubular members, and positioning means for adjusting the effective length of said inner and outer concentric tubular members, and an angular connector at the free end of each of said relatively long tubular support members, and said releasable attachment means defined by suction cups at the free ends of said tubular support members.

10. A buoyant water ski rack according to claim 8, said ski mount assembly having ski support members in the form of an upstanding post on said frame and slotted portions associated with said post to accommodate the side edges of said skis with the skis disposed in edgewise relation to said mounting frame.

11. A buoyant water ski rack according to claim 8, said ski mount assembly having ski support members formed of an upstanding post on said frame, a spring-loaded, enlarged head at one end of said post opposite to said frame, said head having guide channels along the side of said mounting post in facing relation to said frame each adapted to receive a side edge of a ski and said head being spring-loaded in a direction urging it toward said mounting frame.

12. A buoyant water ski rack according to claim 8, there being aligned pairs of adjustable stop members mounting on said frame with said ski support members positioned intermediately between said pairs of adjustable stop members.

13. A buoyant water ski rack according to claim 8, said frame being of generally rectangular configuration having a cross member extending between opposite side members, and a pair of ski mount assemblies extending in a direction parallel to the side frame members of said open frame.

14. A buoyant water ski rack according to claim 13, each of said ski mount assemblies including a mounting post on said cross member and a pair of adjustable stop members slidably positioned on each of said end frame members and adapted to be aligned with one another and with said associated mounting post, said ski support members cooperating with said aligned pairs of adjustable stop members to retain a pair of skis in edgewise upstanding relation to said mounting frame with said adjustable stop members engaging oppositely facing flat surface portions of said skis.

* * * * *